United States Patent
Yu et al.

(10) Patent No.: US 10,044,444 B2
(45) Date of Patent: Aug. 7, 2018

(54) PHOTONIC VECTOR SIGNAL GENERATION WITHOUT PRECODING

(71) Applicant: ZTE Corporation, Shenzhen (CN)

(72) Inventors: Jianjun Yu, Basking Ridge, NJ (US); Yuanquan Wang, Morristown, NJ (US); Xinying Li, Morristown, NJ (US)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 15/223,342

(22) Filed: Jul. 29, 2016

(65) Prior Publication Data

US 2017/0033872 A1 Feb. 2, 2017

Related U.S. Application Data

(60) Provisional application No. 62/199,996, filed on Aug. 1, 2015.

(51) Int. Cl.
*H04B 10/54* (2013.01)
*H04B 10/25* (2013.01)
(Continued)

(52) U.S. Cl.
CPC ......... *H04B 10/541* (2013.01); *G02F 1/2255* (2013.01); *H04B 10/2504* (2013.01); *H04B 10/27* (2013.01); *G02F 2001/212* (2013.01)

(58) Field of Classification Search
None
See application file for complete search history.

(56) References Cited

U.S. PATENT DOCUMENTS

| | | | |
|---|---|---|---|
| 6,941,079 B1 * | 9/2005 | Barozzi | H04B 10/077 359/337 |
| 7,369,290 B1 * | 5/2008 | Cox | G02F 1/0123 359/238 |

(Continued)

OTHER PUBLICATIONS

Cao, Z., et al., "Interleaved and partial transmission interleaved optical coherent orthogonal frequency division multiplexing," Optics Letters, 39(7):2179-2182, Apr. 2014.

(Continued)

*Primary Examiner* — Darren E Wolf
(74) *Attorney, Agent, or Firm* — Perkins Coie LLP

(57) ABSTRACT

A novel and simple photonic vector signal generation scheme at radio frequency (RF) bands enabled by a single-drive Mach-Zehnder modulator (MZM)-based optical carrier suppression (OCS) without precoding techniques and optical filter, which can reduce the complexity of transmitter digital signal processing (DSP), is described. The generation and reception of 16/20/22-Gbaud quadrature-phase-shift-keying (QPSK) vector signals at 16/20/22 GHz are experimentally demonstrated, respectively. The measured bit-error ratio for 16G-baud QPSK vector signals after transmitting over 10-km standard single mode fiber (SSMF) can be under 7% hard-decision forward-error-correction (HD-FEC) threshold of $3.8 \times 10^{-3}$. Moreover, compared to the conventional precoding scheme, the receiver sensitivity can be enhanced by 4 dB at both back-to-back (BTB) and after 10-km SSMF transmission cases, which demonstrates the feasibility of this technique, and show its potential promising application in radio over fiber (RoF) system.

22 Claims, 13 Drawing Sheets

(51) Int. Cl.
*H04B 10/27* (2013.01)
*G02F 1/225* (2006.01)
*G02F 1/21* (2006.01)

(56) References Cited

U.S. PATENT DOCUMENTS

| | | | | |
|---|---|---|---|---|
| 2003/0198478 | A1* | 10/2003 | Vrazel | H04B 10/505 398/183 |
| 2004/0208614 | A1* | 10/2004 | Price | H04B 10/505 398/152 |
| 2010/0092182 | A1* | 4/2010 | Sarchi | G01D 5/35358 398/168 |
| 2011/0013907 | A1* | 1/2011 | Sugihara | G02F 1/0123 398/38 |
| 2014/0029956 | A1* | 1/2014 | Le Taillandier De Gabory | G02F 1/0123 398/186 |

OTHER PUBLICATIONS

Huang, H.-T., et al., "High spectral efficient W-band OFDM-RoF system with direct-detection by two cascaded single-drive MZMs," Optics Express, 21(14):16615-16620, Jul. 2013.

Li, R., et al., "Millimeter-Wave Vector Signal Generation Based on a Bi-Directional Use of a Polarization Modulator in a Sagnac Loop," Journal of Lightwave Technology, 33(1):251-257, Jan. 2015.

Li, W., et al., "Microwave Generation Based on Optical Domain Microwave Frequency Octupling," IEEE Photonics Technology Letters, 22(1):24-26, Jan. 2010.

Li, X., et al., "Fiber-wireless transmission system of 108 Gb/s data over 80 km fiber and 2 x 2 multiple-input multiple-output wireless links at 100 GHz W-band frequency," Optics Letters, 37(24):5106-5108, Dec. 2012.

Li, X., et al., "Fiber-Wireless-Fiber Link for 100-Gb/s PDM-QPSK Signal Transmission at W-Band," IEEE Photonics Technology Letters, 26(18):1825-1828, Sep. 2014.

Li, X., et al., "Photonic vector signal generation at W-band employing an optical frequency octupling scheme enabled by a single MZM," Optics Communications, 349:6-10, Aug. 2015.

Li, X., et al., "QAM Vector Signal Generation by Optical Carrier Suppression and Precoding Techniques," IEEE Photonics Technology Letters, 27(18):1977-1980, Sep. 2015.

Li, X., et al., "W-Band 8QAM Vector Signal Generation by MZM-Based Photonic Frequency Octupling," IEEE Photonics Technology Letters, 27(12):1257-1260, Jun. 2015.

Li, X. et al., "W-Band PDM-QPSK Vector Signal Generation by MZM-Based Photonic Frequency Octupling and Precoding," IEEE Photonics Journal, 7(4):7101906(1-6), Aug. 2015.

Lin, C.-T., et al. "Photonic vector signal generation at microwave/millimeter-wave bands employing an optical frequency quadrupling scheme," Optics Letters, 34(14):2171-2173, Jul. 2009.

Ma, J., et al., "Fiber Dispersion Influence on Transmission of the Optical Millimeter-Waves Generated Using LN-MZM Intensity Modulation," Journal of Lightwave Technology, 25(11):3244-3256, Nov. 2007.

Wang, Y., et al., "Demonstration of 575-Mb/s downlink and 225-Mb/s uplink bi-directional SCM-WDM visible light communication using RGB LED and phosphor-based LED," Optics Express, 21(1):1203-1208, Jan. 2013.

Yu, J., et al., "Centralized Lightwave Radio-Over-Fiber System With Photonic Frequency Quadrupling for High-Frequency Millimeter-Wave Generation," IEEE Photonics Technology Letters, 19(19):1499-1501, Oct. 2007.

Yu, J., et al., "Optical Millimeter-Wave Generation or Up-Conversion Using External Modulators," IEEE Photonics Technology Letters, 18(1):265-267, Jan. 2006.

Yu, J., et al., "Ultra-High-Capacity DWDM Transmission System for 100G and Beyond," IEEE Communications Magazine, S56-S64, Mar. 2010.

Zhang, L., et al., "A novel ECDM-OFDM-PON architecture for Next-Generation optical access network," Optics Express, 18(17): 18347-18353, Aug. 2010.

Zheng, J., et al., "Photonic microwave-signal-mixing technique using phase-coherent orthogonal optical carriers for radio-over-fiber application," Optics Letters, 39(18):5263-5266, Sep. 2014.

\* cited by examiner

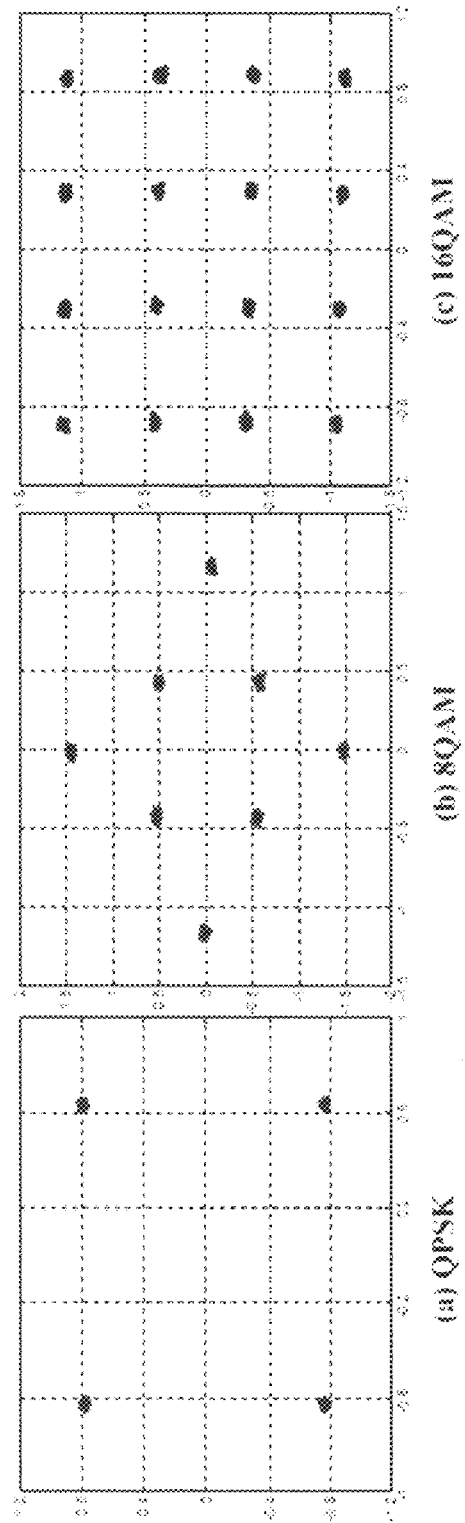

PHOTONIC VECTOR SIGNAL GENERATION WITHOUT PRECODING

CROSS REFERENCE TO RELATED APPLICATIONS

This patent document claims the benefit of priority of U.S. Provisional Patent Application No. 62/199,996, filed on Aug. 1, 2015. The entire content of the before-mentioned patent application is incorporated by reference as part of the disclosure of this document.

BACKGROUND

This patent document relates to digital communication, and, in one aspect, optical communication systems.

There is an ever-growing demand for data communication in application areas such as wireless communication, fiber optic communication and so on. The demand on core networks is especially higher because not only are user devices such as smartphones and computers using more and more bandwidth due to multimedia applications, but also the total number of devices for which data is carried over core networks is increasing. For profitability and to meet increasing demand, equipment manufacturers and network operators are continually looking for ways in which transmission bandwidth can be increased while operational and capital expenditure can be reduced.

SUMMARY

The present document discloses, among other things, techniques for generating modulated optical signals in which photonic frequency multiplexing is achieved by adding an unmodulated carrier to a modulated signal in the electrical domain, and by thus eliminating the need of precoding to compensate for electrical to optical domain conversion distortions. In some embodiments, the resulting transmission scheme can be implemented using a single electro-optical modulator, and without any precoding, thus facilitating a low complexity implementation compared to current implementations.

In one example aspect, a method of optical communication is disclosed. The method includes receiving information bits, modulating the information bits using a first modulation scheme to generate a modulated intermediate signal at a first frequency, generating a combined signal by adding an unmodulated carrier having a second frequency to the modulated intermediate signal, and driving a single electro-optical modulator by the combined signal to produce a vector signal for transmission of the information bits.

In another example aspect, an optical transmission apparatus is disclosed. The apparatus includes an input circuit that receives information bit, a modulator circuit that modulates the information bits using a first modulation scheme to generate a modulated intermediate signal at a first frequency, a radio frequency (RF) signal combiner that produces a combined signal by adding an unmodulated carrier having a second frequency to the modulated intermediate signal, and an single electro-optical modulator that coverts the combined signal into a vector signal for transmission over an optical communication medium.

In another example aspect, a method for generating information bits from a received optical transmission at an optical receiver is disclosed. The method includes converting the received optical transmission into an electrical domain signal, wherein the optical transmission comprises a signal generated by combining a modulated intermediate signal generated by modulating information bits on a carrier at a first frequency using a modulation scheme and an unmodulated carrier having a second frequency, and demodulating the electrical domain signal to recover the information bits.

In yet another aspect, an optical communication receiver apparatus is disclosed. The apparatus includes a first stage hardware that converts the received optical transmission into an electrical domain signal, wherein the optical transmission comprises a signal generated by combining a modulated intermediate signal generated by modulating information bits on a carrier at a first frequency using a modulation scheme and an unmodulated carrier having a second frequency, and a second stage that demodulates the electrical domain signal to recover the information bits.

These and other aspects, and their implementations and variations are set forth in the drawings, the description and the claims.

BRIEF DESCRIPTION OF THE DRAWINGS

FIG. 3A depicts an example of simulated constellations for 8-Gbaud vector signals at 16 GHz with QPSK modulated.

FIG. 3B depicts an example of simulated constellations for 8-Gbaud vector signals at 16 GHz with 8QAM modulated.

FIG. 3C depicts an example of simulated constellations for 8-Gbaud vector signals at 16 GHz with 16QAM modulated.

DETAILED DESCRIPTION

Figure 1A:
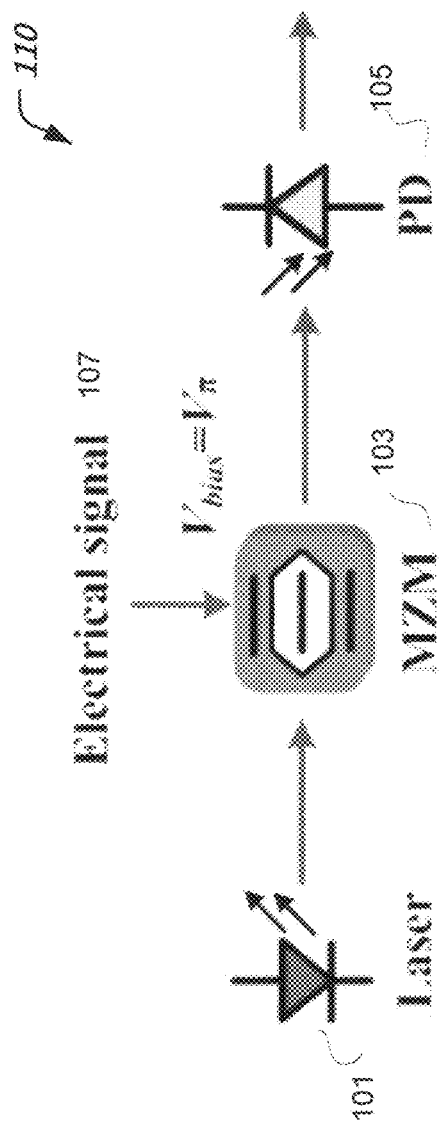
FIG. 1A shows an example of photonic vector signal generation by a single-drive MZM; MZM: Mach-Zehnder modulator, PD: photodiode.

Due to the wide spreading of multimedia services, broadband internet, and cloud services, demands on the capacity of access networks are growing continuously. Numerous access techniques, such as passive optical network (PON), 802.11 Wi-Fi, visible light communication (VLC), radio-over-fiber (RoF) technology have attracted increasing interest for their potential use in future broadband wireless communications and future network services like 5G due to the advantages of inherent wide bandwidth, wide coverage, high mobility and low propagation loss of optical fiber transmission. Additionally, in order to achieve high spectral efficiency (SE) in terms of number of bits transmitted per Hertz per second, and maximum transmission capacity, techniques such as vector quadrature-amplitude-modulation (QAM) signal modulation formats are desirable. Thus, the combination of vector signal modulation and RoF technology can efficiently overcome the limitation of insufficient spectrum resources and provide higher data rate transmission. However, the task of practically generating radio frequency (RF) vector signals at a high-frequency band based on the bandwidth-limited electrical device vector quadrature-amplitude-modulation (QAM) signal modulation formats are useful. Thus, the combination of vector signal modulation and RoF technology may be efficiently overcome the limitation of insufficient spectrum resources and provide higher data rate transmission. However, how to practically generate vector signals at a high-frequency band based on the bandwidth-limited electrical devices still remains unsolved.

Recently, several RoF systems have been proposed and experimentally investigated by photonics techniques. Remote heterodyning has been considered as a promising candidate due to the ease of implementation. But either narrow-linewidth laser is required or the generated RF signal is not stable due to unlocked frequency of free-running lightwaves. External intensity modulation incorporating photonic frequency multiplication, such as frequency doubling and tripling, is a more attractive and cost-effective solution to generate stable and high-frequency RF vector signals, which can also greatly reduce the bandwidth requirement for electrical devices at transmitter end. However, precoding is needed to address the phase multiplication induced by the frequency multiplication, which causes an undesirable increase in the complexity of transmitter digital signal processing (DSP). The techniques disclosed in the present document solve the above discussed shortcoming in the prior art, and more.

In some embodiments disclosed in the present document, a novel photonic QAM vector signal generation scheme at RF bands is enabled by a single-drive Mach-Zehnder modulator (MZM)-based optical carrier suppression (OCS). At the transmitter side, an additional unmodulated carrier is added to a modulated intermediate signal, and the combined signals are used to drive the MZM. At the receiver end, the vector RF signal can be obtained by the beating of modulated signals and unmodulated carrier. By adjusting the carrier-to-signal power ratio (CSPR), no precoding technique and optical filter are needed in this scheme. In one advantageous aspect, this can reduce the complexity of transmitter DSP (digital signal processing) and the system cost.

The inventors have experimentally demonstrated the generation and reception of 16/20/22-Gbaud quadrature-phase-shift-keying (QPSK) vector signals at 16/20/22 GHz utilizing a single MZM, respectively. Meanwhile, the 16-Gbaud QPSK signals can be successfully transmitted over 10-km standard single mode fiber (SSMF), with the measured bit-error-rate (BER) results under the hard-decision forward-error-correction (HD-FEC) threshold of $3.8 \times 10^{-3}$. Compared to a conventional precoding-based vector signal generation scheme, the receiver sensitivity can be enhanced by 4 dB. Multi-amplitude QAM modulation formats such as 8QAM and 16QAM are also numerical analysis and simulated investigated, which validate it is suitable for high-order modulation scheme.

Figure 9:
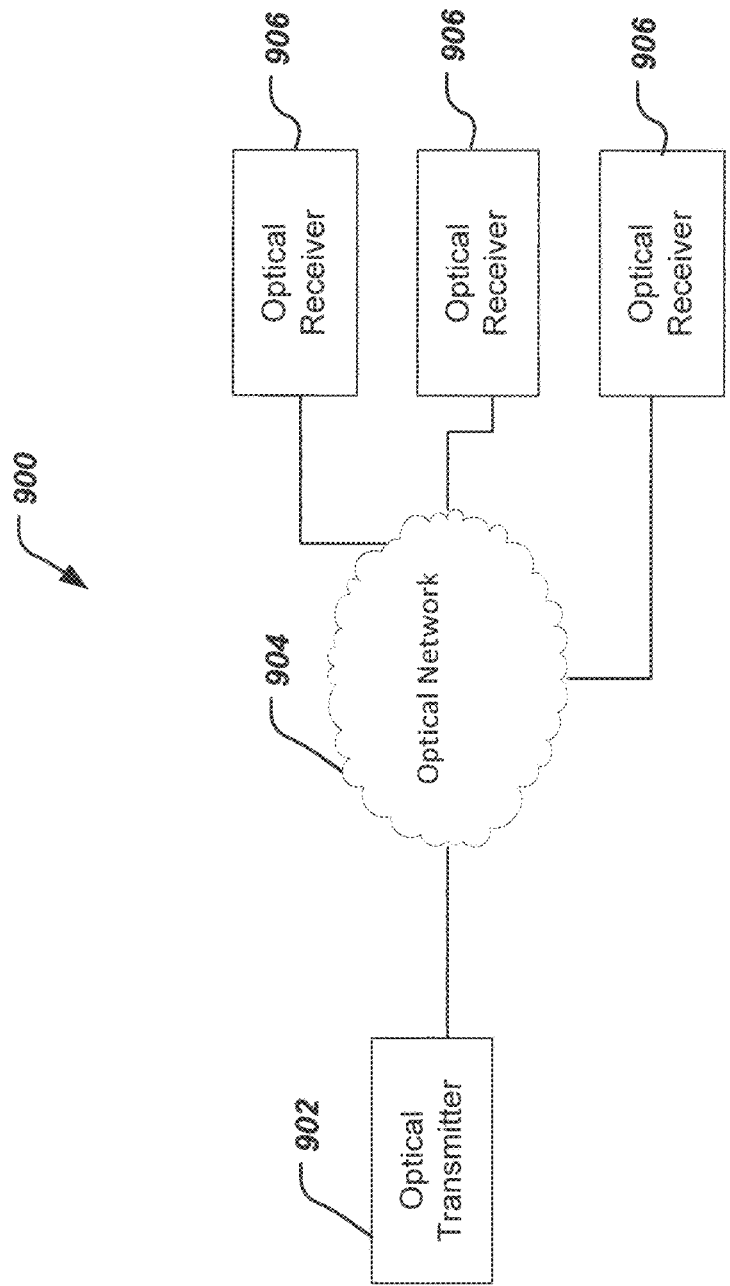
FIG. 9 shows an example optical communication system.

FIG. 9 depicts an optical communication system 900 in which the presently disclosed technology can be embodied. One or more optical transmitters 902 are communicatively coupled via an optical network 904 with one or more optical receivers 906. The optical network 904 may comprise optical fibers that extend in length from several hundred feet (e.g., last mile drop) to several thousands of kilometers (long haul networks). The transmitted optical signals may go through intermediate optical equipment such as amplifiers, repeaters, switch, etc., which are not shown in FIG. 9 for clarity. The data transmission and reception techniques described in the present document can be implemented in the optical transmitters 902 and/or the optical receivers 906.

Brief Overview of OCS Based Vector Signal Generation without Precoding

Figure 1B:
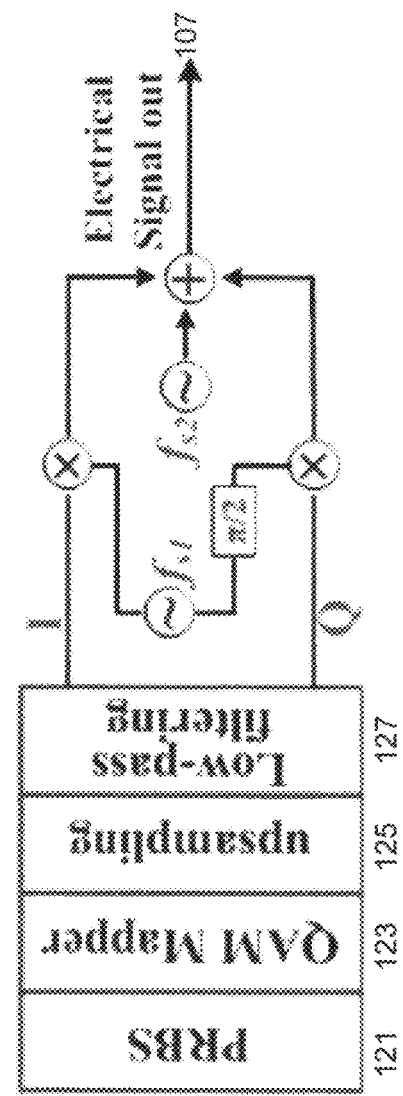
FIG. 1B shows an example of Vector-modulated RF signal generation without precoding.

FIG. 1A shows an example scheme 110 for photonic multi-amplitude QAM vector signal generation at RF bands by OCS based photonic frequency doubling enabled by a single-drive MZM. As depicted in FIG. 1A and FIG. 1B, a continuous-wavelength (CW) lightwave at $f_0$ from a commercial laser 101 is modulated by the vector signals 107. The electrical signals 107 may represent modulated information bits, e.g., user and control data. In some cases, such as for testing or calibration purpose, the electrical signal may be generated using a pseudorandom binary sequence (PRBS), as depicted in FIG. 1B, 121. The information bits may be vector mapped (123) using a modulation scheme such as 4, 8, 16, 32 or higher QAM modulation, optionally upsampled (125) and the images from upsampling may be removed using a lowpass filter (127) that retains one lowpass image of the mapped information bits. The resulting data streams are used as I and Q data streams for subsequent modulation.

The I and Q symbol streams are then modulated using signals which are composed of modulated intermediate signals at $f_{s1}$ and additional unmodulated carrier at $f_{s2}$ via a single-drive MZM 103. Assuming the CW lightwave and RF vector signals can be respectively expressed as $$E_{CW}(t)=A\exp(j2\pi f_0 t). \quad \text{Eq. (1)}$$

$$E_{RF}(t)=V_1(t)\cos\ [2\pi f_{s1}t+\varphi(t)]+B\cos\ [2\pi f_{s2}t]. \quad \text{Eq. (2)}$$

where A and B are constant and denote the amplitudes of the CW output at frequency $f_0$ and the unmodulated carrier at frequency $f_{s2}$, respectively. $V_1$ and $\varphi$ represent the amplitude and phase of the modulated RF signal at frequency $f_{s1}$, respectively. The electrical field at the output of MZM can be expressed as:

$$E_{MZM}(t) = \frac{1}{2}E_{CW}(t)\left[1+\exp\left(j\frac{\pi}{V_\pi}(E_{RF}(t)+V_d)\right)\right]. \quad \text{Eq. (3)}$$

of which $V_\pi$ and $V_d$ denote the half-wave voltage and biased direct current voltage of the MZM, respectively. Substituting Eq. (1) and Eq. (2) into Eq. (3) and using the Jocobi-Anger expansion, Eq. (3) can be rewritten as:

$$E_{MZM}(t) = \quad \text{Eq. (4)}$$
$$\frac{1}{2}E_{CW}(t) + \frac{1}{2}E_{CW}(t)\sum_{p=-\infty}^{\infty} j^p J_p(m_2)\exp(jp2\pi f_{s2}t)\times\exp(jm_0)$$
$$\sum_{q=-\infty}^{\infty} j^q J_q(m_1)\exp(jq2\pi f_{s1}t+jq\varphi(t)).$$

$$m_0 = \pi\frac{V_d}{V_\pi},\ m_1 = \pi\frac{V_1}{V_\pi},\ m_2 = \pi\frac{B}{V_\pi}. \quad \text{Eq. (5)}$$

where $J_p$ and $J_q$ are the first kind Bessel function of order p and q, respectively. $m_0$ and $m_2$ are constant, while $m_1$ is variant with time when the transmitter data adopts multi-amplitude vector modulation. When the MZM is biased at its minimum transmission point to realize OCS modulation, the Eq. (4) can be expressed as:

$$E_{MZM}(t)=KE_{CW}(t)\{J_0(m_1)[\exp(j2\pi f_{s2}t)+ \\ \exp(-j2\pi f_{s2}t)]+\alpha J_1(m_1)[\exp(j2\pi f_{s1}t+j\varphi)+ \\ \exp(-j2\pi f_{s1}t-j\varphi)]\}. \quad \text{Eq. (6)}$$

of which K is a constant, and α is a coefficient which will be varied as the CSPR. Eq. (6) shows that the generated optical signals compose of four carriers: two unmodulated first-order subcarriers spaced by $2f_{s2}$ and two modulated first-order subcarriers spaced by $2f_{s1}$. In some embodiments, and for simplicity of explanation, in the further disclosure $f_{s2}=f_{s1}$ is assumed.

When these four generated first-order subcarriers are detected by the square-law photodiode (PD) 105, the leading terms of the generated RF current are given by:

$$i_{RF}(t)=R\{2J_0(m_1)J_1(m_1)\cos(j2\pi\cdot 2f_{s1}t+j\varphi(t))+2J_0(m_1)J_1 \\ (m_1)\cos(\varphi(t))+\alpha J_1^2(m_1)\cos(j2\pi\cdot 2f_{s1}t+2\varphi(t))\} \quad \text{Eq. (7)}$$

where R is related to the PD responsivity. The first term in Eq. (7) is generated from the beating of one unmodulated subcarrier and one modulated subcarrier, which is the desired RF vector signals at $2f_{s1}$, and is double of the driving RF signals. The second term is the baseband signals which can be neglected. The third term is obtained from the beating of two modulated subcarriers with whose center frequency also locating at $2f_{s1}$, which will induce crosstalk. By adjusting the CSPR, i.e., coefficient α, the crosstalk can be reduced to an acceptance value. As for the $J_0(m_1)$ and $J_1(m_1)$ in the first term, it can be compensated by digital signal processing.

As previously described, one example of a generation procedure of driving multi-amplitude QAM RF signal is depicted in FIG. 1B. A data source, e.g., user data, or in the depicted embodiment a pseudo random binary sequence (PRBS) 121, is first mapped onto QAM modulation format 123, and then up-sampling 125 is implemented. After passing through a low pass filter (LPF) 127, the baseband signals are finally up-converted to a desired RF band. Subsequently, an additional cosinusoidal signal is added to the RF vector signals. In some embodiments, this addition can be accomplished by running a software program on a processor, e.g., by MATLAB programming, and then the generated combined signals are uploaded into an arbitrary waveform generator (AWG) with 64-GSa/s sampling rate to drive the MZM biased at its minimum transmission point. According to the analysis above, the transmitted signals can be QPSK, 8QAM or higher-order modulated.

Figures 2A, 2B, 2C:
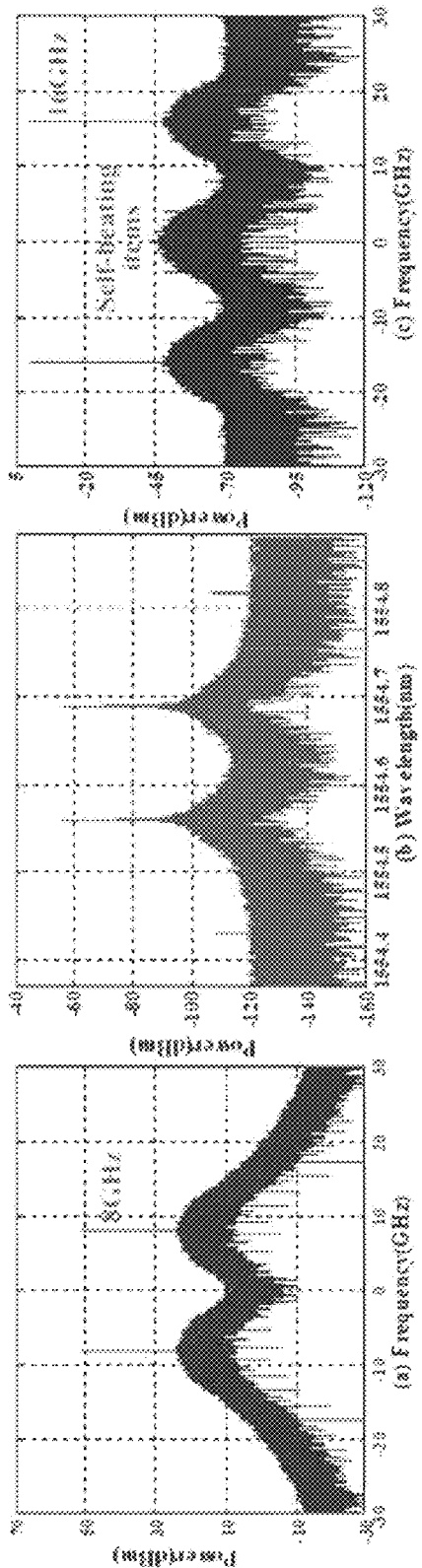
FIG. 2A shows an example of electrical spectrum of original signals.
FIG. 2B shows an example of output optical spectrum of MZM.
FIG. 2C shows an example of electrical spectrum of received signals after square-law PD.

In some embodiments, an 8-GHz RF signal carrying 8-Gbund QPSK/8QAM/16QAM modulated transmitter data is generated. The inserted unmodulated carrier is also located at 8 GHz. The electrical spectra of the generated signals are depicted in FIG. 2A. FIGS. 2B and 2C show the output optical spectra of MZM and the electrical spectra of received signals after PD. It can be easily found that a peak is located at 8 GHz in FIG. 2A, and the original optical carrier is suppressed in FIG. 2B. The electrical spectrum in FIG. 2C is consistent with Eq. (7).

The received constellations for 8-Gbaud QPSK/8QAM/16QAM vector signals at 16 GHz are illustrated in FIG. 3A, FIG. 3B and FIG. 3C, respectively. The BERs are all zero for these three modulation formats, which validate it feasibility to generate high-frequency RF vector signals.

Example Experimental Setup and Results

Figure 4:
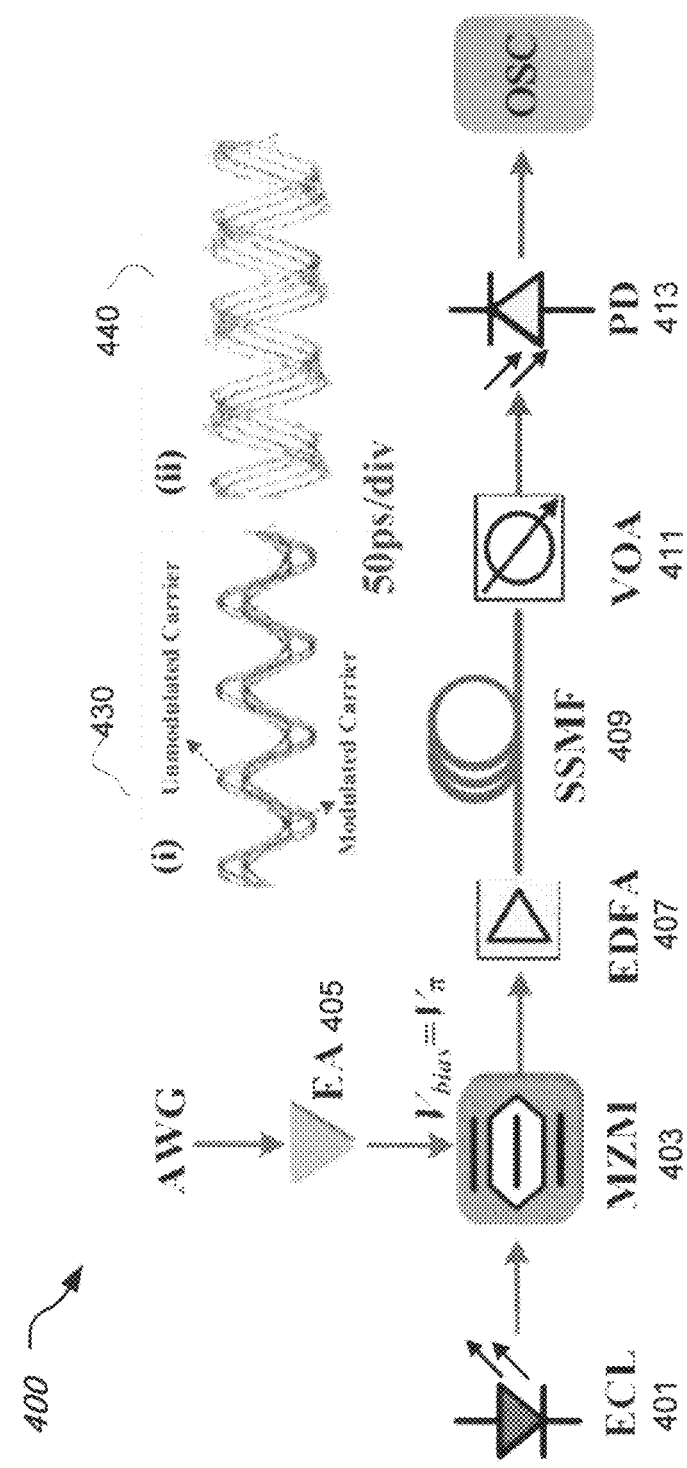
FIG. 4 depicts an example setup of a photonic vector signal generation without precoding. Output electrical waveforms (50 ps/div) of AWG at the case of Inset (i): with precoding, Inset (ii): without precoding (ECL: external cavity laser, AWG: arbitrary waveform generator, EA: electrical amplifier, MZM: Mach-Zehnder modulator, EDFA: erbium-doped fiber amplifier, SSMF: standard single mode fiber, VOA: variable optical attenuator, PD: photodiode, OSC: oscilloscope).
Figures 5A, 5B, 5C, 5D, 5E, 5F:
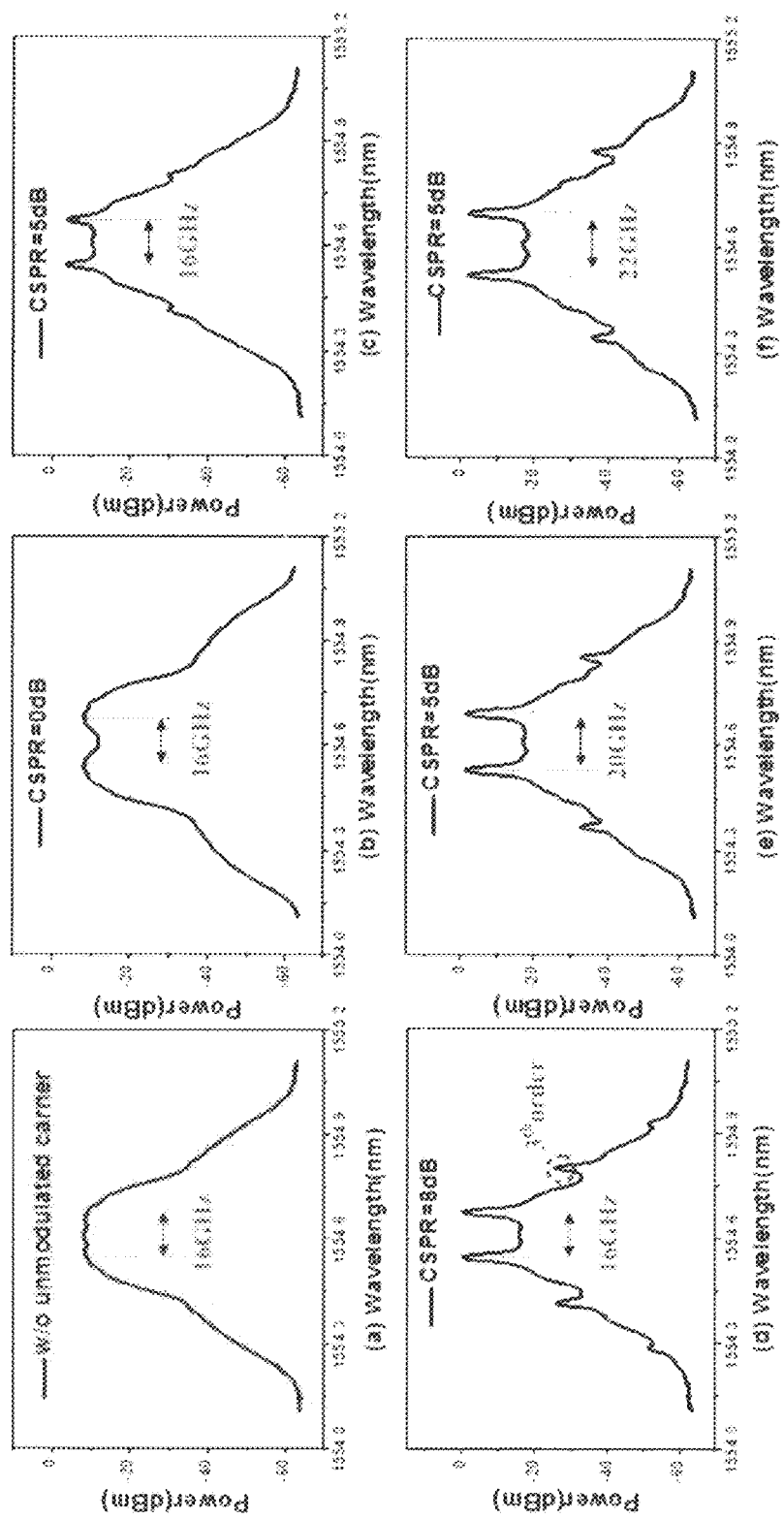
FIG. 5A depicts an example of output spectra of MZM for 16Gbaud QPSK signals without unmodulated carrier at 16 GHz.
FIG. 5B depicts an example of output spectra of MSM for 16Gbaud QPSK signals with CSPR=0 dB at 16 GHz.
FIG. 5C depicts an example of output spectra of MSM for 16Gbaud QPSK signals with CSPR=5 dB at 16 GHz.
FIG. 5D depicts an example of output spectra of MSM for 16Gbaud QPSK signals with CSPR=8 dB at 16 GHz.
FIG. 5E depicts an example of output spectra of MSM for 16Gbaud QPSK signals with CSPR=5 dB at 20 GHz.
FIG. 5F depicts an example of output spectra of MSM for 16Gbaud QPSK signals with CSPR=5 dB at 22 GHz.

FIG. 4 depicts an example of an experimental working system for the photonic QAM vector signal generation at 16 GHz, transmission and reception employing a single-drive MZM-based OCS. For simplicity, only QPSK is used in this experimental demonstration. The CW output with central wavelength at 1554.6 nm from a commercial external cavity laser (ECL) 401 is modulated by the aforementioned driving signals, which consist of 16-Gbaud RF signals at 8 GHz and 8-GHz unmodulated cosinusoidal signals. The used MZM 403 in this embodiment has a 3-dB bandwidth of ~36 GHz, 2.8-V half-wave voltage (Vπ) at 1 GHz and 5-dB insertion loss. The 8-GHz QPSK signals combined with 8-GHz unmodulated cosinusoidal signals are boosted by an electrical amplifier (EA) 405 to ~20 dBm to drive the MZM. The MZM is biased at its minimum transmission point to realize OCS modulation. Before being transmitted over a 10-km SSMF 409, the generated optical signals composed of four optical carriers are amplified using an erbium-doped fiber amplifier (EDFA) 407 to compensate for modulation loss and insertion loss. After transmitting over a span of 10-km SSMF, the optical signals pass through a variable optical attenuator (VOA) 411, which is used to adjust the input power to PD 413.

At the receiver side, the 16-GHz QPSK modulated optical RF signals are detected by a commercial available PD with 3-dB bandwidth of 15 GHz. After square-law detection, the 16-GHz QPSK modulated electrical RF signal is captured by a digital oscilloscope (OSC) with 80-GSa/s sampling rate and 30-GHz electrical bandwidth. The original QPSK signals can be recovered from the 16-GHz electrical RF signal after advanced offline DSP, which includes resampling, intermediate frequency (IF) down conversion, constant modulus algorithm (CMA) equalization, frequency offset estimation (FOE), and carrier phase estimation (CPE).

In order to evaluate the performance of the disclosed RF vector signal generation, a comparison between this technique and a prior art precoding scheme was conducted. The output electrical waveforms (50 ps/div) for 16-Gbaud RF vector signals at 8 GHz generated by these two schemes are inserted in FIG. 4 as inset (i) 430 and inset (ii) 440. The electrical waveform in inset (ii) is not clear, while two level signals can be clearly seen from inset (i). As marked in FIG. 4, the higher level is the unmodulated carrier, while the lower one is the modulated vector signals. The CSPR can be adjusted at the transmitter DSP.

FIGS. 5A-5D illustrate an example of the output optical spectra (0.02-nm resolution) for 16-Gbaud signals of the MZM with different CSPR values. FIGS. 5E and 5F give the optical spectra of 20/22-Gbaud vector signals at 20/22 GHz, respectively. A high CSPR can thus efficiently reduce the crosstalk induced by the beating of two modulated vector signals. But From FIGS. 5A-5D it is seen that the $3^{th}$-order harmonic may increase with the increasing CSPR. Additionally, the optical signal-to-noise ratio (SNR) of vector signals will also be decreased with the increasing CSPR (carrier to sideband power ratio). Thus, CSPR cannot take any arbitrary value but an optimal CSPR is useful.

As analyzed before, in order to render this system work at the optimal condition, the parameter CSPR should be first measured.

Figure 6:
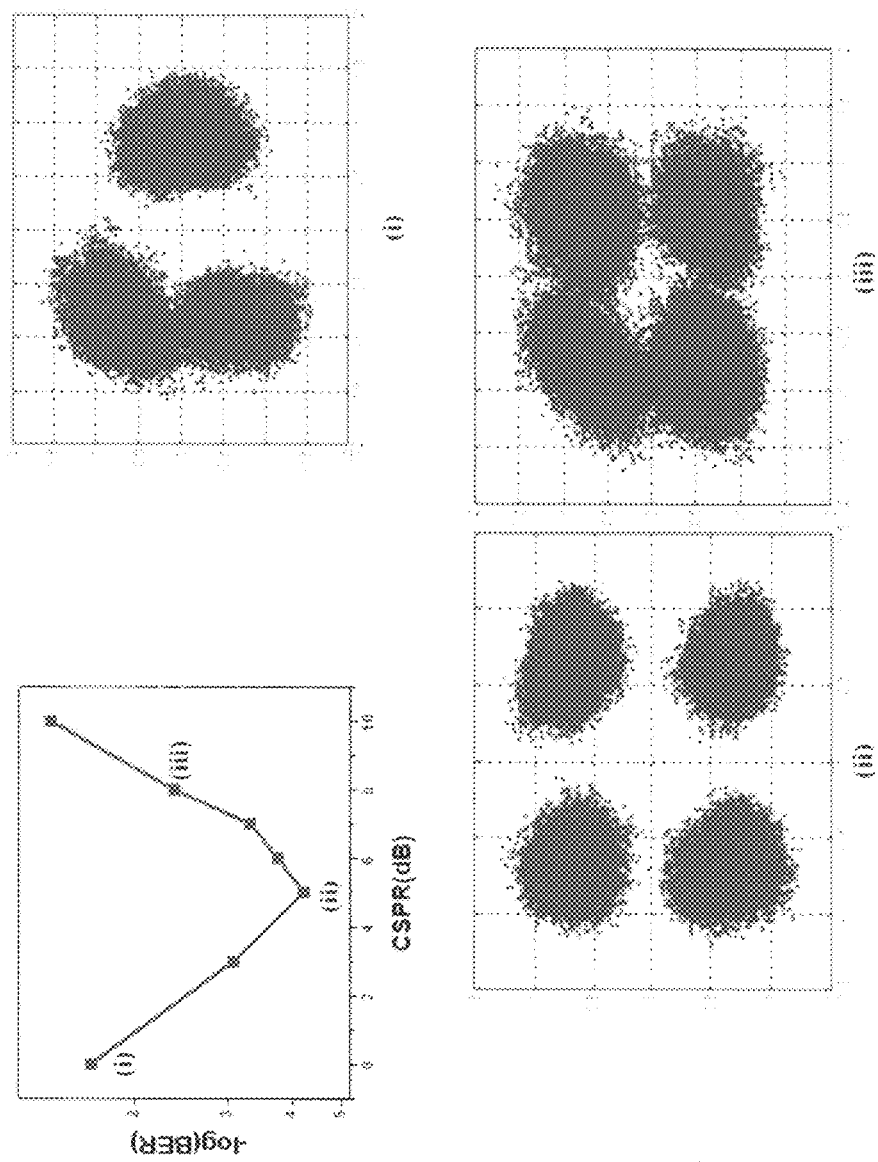
FIG. 6 shows an example of the measured BER performances versus CSPR for 16-Gbaud QPSK signals at 16 GHz. Constellations with different CSPR inset (i): 0 dB, inset (ii): 5 dB, inset (iii): 8 dB.

FIG. 6 shows the measured BER performance for 16-Gbaud vector signals at 16 GHz versus the CSPR at the received optical power of −8 dBm. The CSPR are varied from 0 dB to 10 dB. From 0 dB to 5 dB, the BER performance is improved with the increasing of CSPR. But when the CSPR is larger than 5 dB, the BER performance turns to deteriorate. So the optimal CSPR may be around 5 dB. Similar conclusions can also be found from the constellations inserted in FIG. 6. When the CSPR is too low, the crosstalk induced by the beating term of two modulated vector signals cannot be neglected. As shown in inset (i), the four constellations points can even turn to 2 or 3 points due to the phase will also be doubled. At a high CSPR, the SNR of vector signal is too low, which will result the constellations cannot be clearly separated as depicted in inset (iii).

Figure 7:
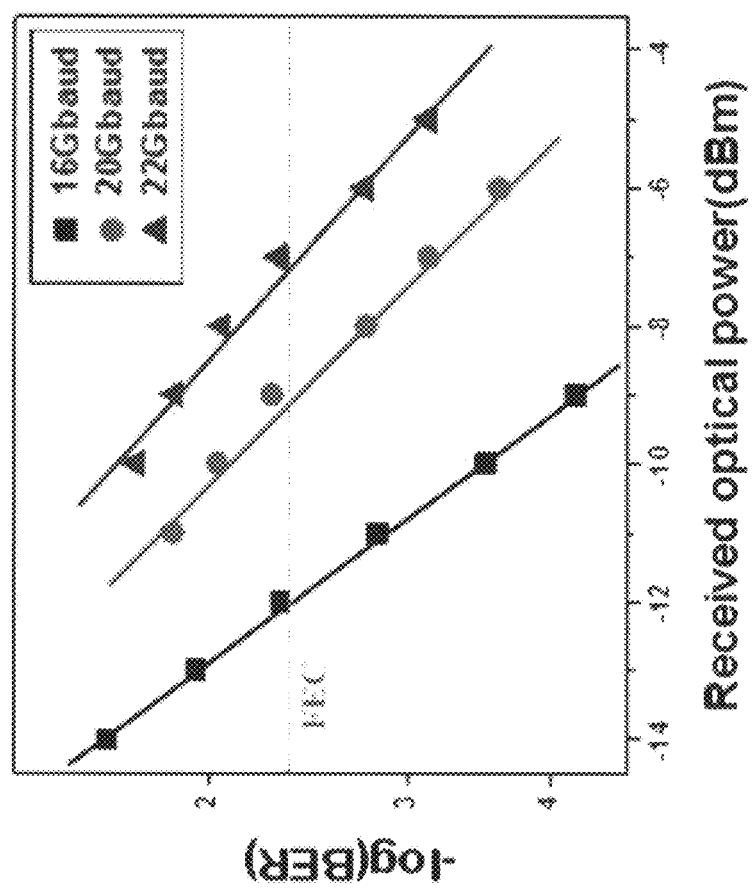
FIG. 7 shows an example of the measured BER results versus received optical power for 16/20/22-Gbaud QPSK vector signals at 16/20/22 GHz, respectively.

In the experimental results provided in this document, unless otherwise mentioned, the CSPR are all set at 5 dB. 20/22-Gbaud QPSK RF signals at 20/22 GHz can be also successfully generated and the BER performances are measured at optical back-to-back (OBTB) case. The measured BER performance for 16/20/22-Gbaud QPSK signals versus received optical power is depicted in FIG. 7. Compared to 20-Gbaud and 22-Gbaud signals, the receiver sensitivity for 16-Gbaud signals at the HD-FEC threshold of $3.8 \times 10^{-3}$ can be enhanced by 3 dB and 5 dB, respectively. The limitation of higher-frequency RF vector signal generation in our investigation is the limited bandwidth of AWG and PD.

Figure 8:
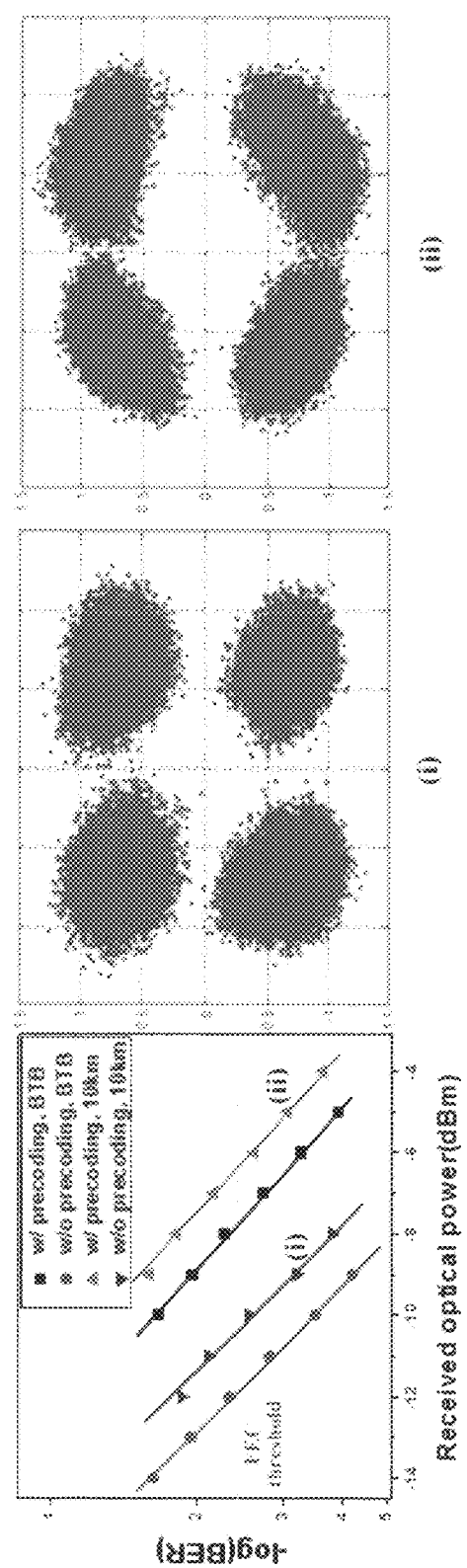
FIG. 8 shows an example of the measured BER results versus received optical power for 16-Gbaud QPSK signals at 16 GHz with/without precoding at BTB/after 10-km SSMF transmission cases. Received constellations after 10-km SSMF transmission at inset (i) −9 dBm without precoding, and inset (ii): −5 dBm with precoding.

With respect to FIG. 8, a comparison between an embodiment that generates information signals without precoding and another embodiment with precoding techniques is made. These two schemes are measured in the same testbed. FIG. 8 shows the measured BER results versus received optical power for 16-Gbaud signals at 16 GHz with and without precoding at OBTB (optical back to back) and after 10-km SSMF (standard single mode fiber) transmission cases. 10-km SSMF transmission will cause 1.5-dB receiver sensitivity penalty at both two cases due to chromatic dispersion. But compared to precoding vector signal generation scheme, the scheme outlined in this document can provide 4-dB receiver sensitivity at HD-FEC threshold. The received constellation in inset (i) is much clearer and more symmetrical than that in inset (ii). These results can obviously demonstrate the feasibility and validate the superiority of this proposal.

Figure 10:
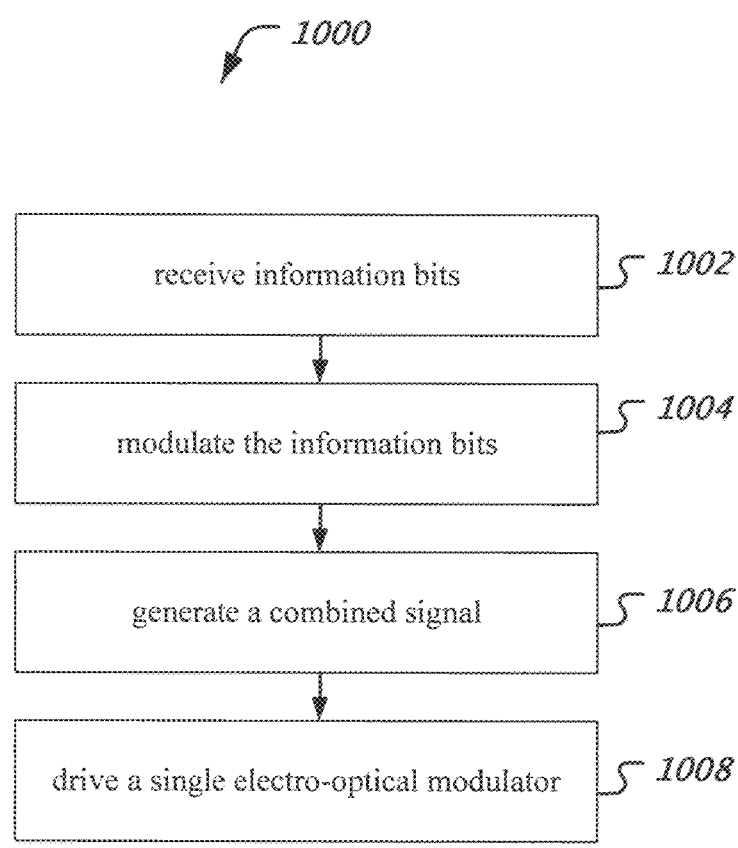
FIG. 10 shows an example flowchart of an optical signal transmission method.

FIG. 10 depicts an example flowchart for a method 1000 of optical communication. The method 1000 may be implemented in transmission circuitry of the apparatuses 902, 904.

The method 1000 includes receiving information bits (1002). The information bits may represent network traffic such as user or control data and may be received from an external equipment such as a bus, router or a switch into the transmitter circuitry. One of several well-known techniques and industry standards for data communication interfaces, e.g., gigabit Ethernet, PCI, etc. may be used.

The method 1000 includes modulating the information bits using a first modulation scheme to generate a modulated intermediate signal at a first frequency (1004). As previously described, the modulation scheme may be, for example, QAM or QPSK modulation scheme with multi-level constellations such as four or higher.

The method 1000 includes generating a combined signal by adding an unmodulated carrier having a second frequency to the modulated intermediate signal (1006). For example, in some embodiments, e.g., as described with respect FIG. 1B and FIG. 4, I and Q components may be generated by mixing with a first frequency fs1 and a second frequency carrier at frequency fs2 may be added to the resulting vector modulated signal.

The method 1000 includes driving a single electro-optical modulator by the combined signal to produce a vector signal for transmission of the information bits (1008).

As described herein, in some embodiments, the electro-optical modulator is of a Mach-Zehnder modulator (MZM) type. In some embodiments, the electro-optical modulator is an external electro-optical modulator. In some embodiments, the MZM electro-optical modulator is biased to operate at a minimum transmission point. In some embodiments, an intensity modulator type MZM may be used.

As described, e.g., with respect to FIGS. 3A-3C, in some embodiments, the first modulation scheme uses a quadrature amplitude modulation (QAM) constellation of size four or higher. One advantageous aspect of method 1000 may be that the combined signal is generated without precoding amplitudes to mitigate distortions.

In some embodiments, the method 1000 may include using an external cavity laser to input an optical carrier signal to the single electro-optical modulator.

As previously discussed, the resulting signal of the combined signal, without any additional filtering, has a frequency spectrum that includes a first subcarrier pair spaced at twice the first frequency and a second subcarrier pair spaced at twice the second frequency. For example, referring back to Eq. (5), the output of MZM has two modulated and two unmodulated carriers. If fs1 and fs2 are selected to be numerically of the same value, then the frequency spacing between the unmodulated subcarriers and the modulated subcarriers will be equal to each other's spacing. Otherwise, the frequency spacing will be different from each other. In operational scenarios, for simplicity and symmetry, the two values may be chosen to be identical. However, in some embodiments, these values may be selected to be different, e.g., when different modulation constellation are desired to be used due to different data bandwidth needs.

In some embodiments, an optical transmission apparatus 1200 includes an input circuit 1202 that receives information bit, a modulator circuit 1204 that modulates the information bits using a first modulation scheme to generate a modulated intermediate signal at a first frequency, a radio frequency (RF) signal combiner 1206 that produces a combined signal by adding an unmodulated carrier having a second frequency to the modulated intermediate signal, and an single electro-optical modulator 1208 that coverts the combined signal into a vector signal for transmission over an optical communication medium. The input circuit 1202 may be a digital input interface of a processor, an industry standard bus, data pins external to a chip, a serial or parallel link, and so on. The modulator circuit may comprise an arrangement of transistors and other active or passive components and may be implemented partly in software (e.g., instructions running on a processor). The RF signal combiner 1206 may be selected from among many well-known off-the-shelf solutions and may include two or more balanced input RF connectors whose RF signals are combined at an output connector. The single electro-optical modulator may be an MZM modulator. The apparatus may further implement techniques described in this document.

Figure 11:
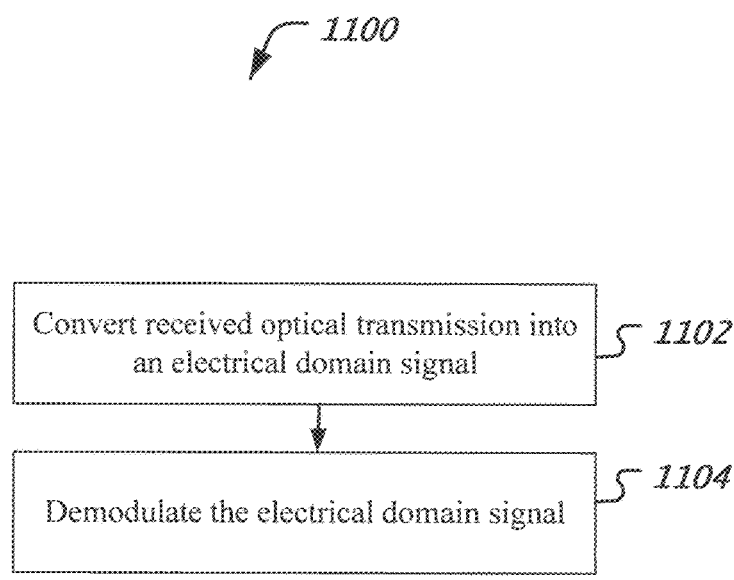
FIG. 11 shows an example flowchart of an optical signal reception method.
Figure 12:
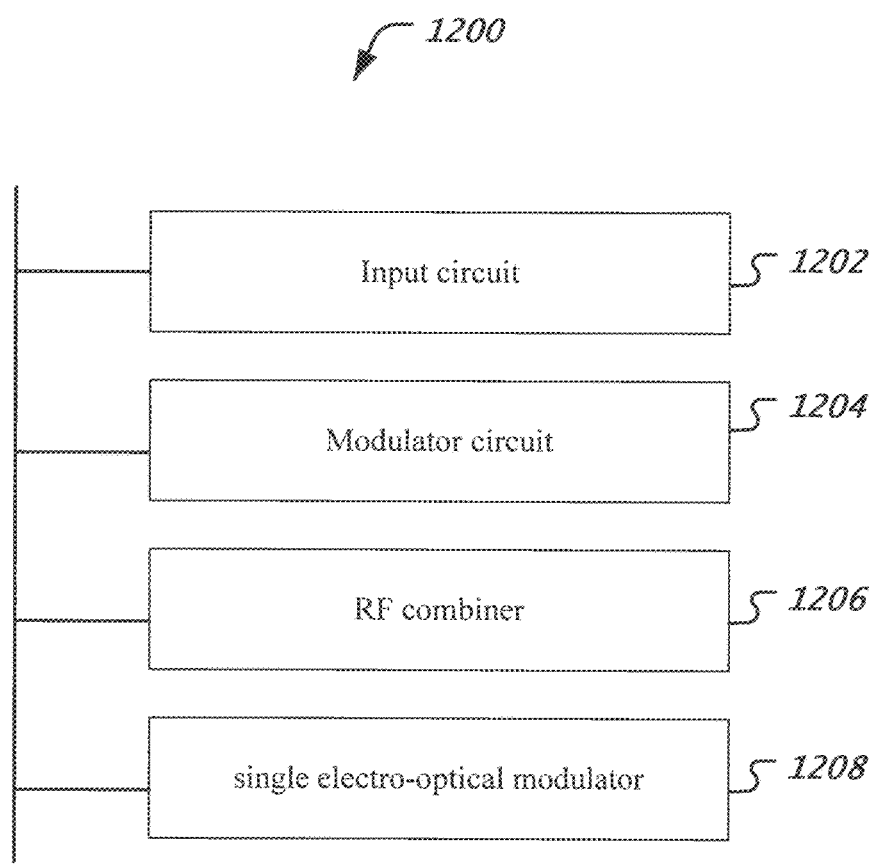
FIG. 12 shows an example block diagram of an optical signal transmission apparatus.
Figure 13:
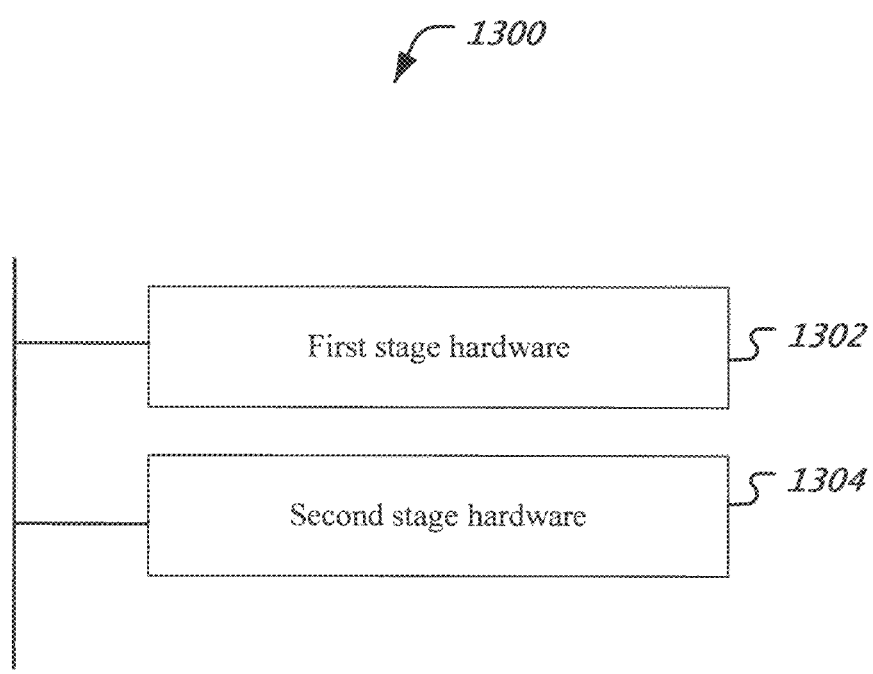
FIG. 13 shows an example block diagram of an optical signal reception apparatus.

FIG. 11 depicts a flowchart of an example method 1100 for generating information bits from a received optical transmission at an optical receiver. The method 1100 includes converting the received optical transmission into an electrical domain signal (1102). The signal may be generated using the method 1000. For example, in some embodiments, the optical transmission comprises a signal generated by combining a modulated intermediate signal having a first frequency and an unmodulated carrier having a second frequency, with the modulated intermediate signal being generated by modulating information bits on a carrier using a modulation scheme. The method 1100 also includes, at 1104, demodulating the electrical domain signal to recover the information bits.

In some embodiments, an optical communication receiver apparatus 1300 includes a first stage hardware 1302 that converts the received optical transmission into an electrical domain signal, wherein the optical transmission comprises a signal generated by combining a modulated intermediate signal having a first frequency and an unmodulated carrier having a second frequency, with the modulated intermediate signal being generated by modulating information bits on a carrier using a modulation scheme; and a second stage hardware 1304 that demodulates the electrical domain signal to recover the information bits. In some embodiments, the first stage hardware comprises a variable gain attenuator to attenuate the received optical transmission and a photo diode to perform photo detection of an output of the variable gain attenuator to generate the electrical domain signal.

It will be appreciated that the present document discloses a novel photonic QAM vector signal generation scheme at RF bands enabled by a single-drive MZM-based OCS. No precoding technique and optical filter are needed in this scheme. In one advantageous aspect, the scheme will reduce the complexity of transmitter DSP and the system cost. It will also be appreciated that experimental results for reception of 16/20/22-Gbaud QPSK vector signals at 16/20/22 GHz utilizing a single MZM, respectively have been disclosed. Meanwhile, the 16-Gbaud QPSK signals can be successfully transmitted over 10-km SSMF, with the measured BER results under the HD-FEC threshold of $3.8\times10^{-3}$.

It will further be appreciated that using the disclosed technology, compared to conventional precoding-based vector signal generation scheme, the receiver sensitivity can be enhanced by 4 dB. The scheme is also suitable for multi-amplitude QAM modulation formats such as 8QAM and 16QAM. Moreover, further capacity enhancement can be achieved by increasing the electrical bandwidth and adopting higher-order modulation formats.

The disclosed and other embodiments and the functional operations and modules described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A method of optical communication, implemented at a transmitter in an optical communication network, comprising:
    receiving information bits;
    modulating the information bits using a quadrature modulation scheme to generate a modulated intermediate signal at a first frequency;
    generating a combined signal by adding an unmodulated carrier having a second frequency to the modulated intermediate signal; and
    driving a single electro-optical modulator by the combined signal to produce a vector signal for transmission of the information bits.

2. The method of claim 1, wherein the electro-optical modulator is of a Mach-Zehnder modulator (MZM) type.

3. The method of claim 1, wherein the electro-optical modulator is an external electro-optical modulator.

4. The method of claim 1, wherein the quadrature modulation scheme uses a quadrature amplitude modulation (QAM) constellation of size four or higher.

5. The method of claim 1, wherein the combined signal is generated without precoding amplitudes to mitigate distortions.

6. The method of claim 1, further including using an external cavity laser to input an optical carrier signal to the single electro-optical modulator.

7. The method of claim 2, wherein the MZM electro-optical modulator is biased to operate at a minimum transmission point.

8. The method of claim 2, wherein the MZM electro-optical modulator includes an MZM intensity modulator.

9. The method of claim 1, wherein a frequency spectrum of the vector signal comprises a first subcarrier pair spaced at twice the first frequency and a second subcarrier pair spaced at twice the second frequency.

10. The method of claim 1, further including performing polarization domain multiplexing of the combined signal with another modulated information signal.

11. An optical signal transmission apparatus, comprising:
    an input circuit that receives information bits;
    a modulator circuit that modulates the information bits using a quadrature modulation scheme to generate a modulated intermediate signal at a first frequency;
    a radio frequency (RF) signal combiner that produces a combined signal by adding an unmodulated carrier having a second frequency to the modulated intermediate signal; and
    no more than one electro-optical modulator that coverts the combined signal into a vector signal for transmission over an optical communication medium.

12. The apparatus of claim 11, wherein the electro-optical modulator is of a Mach-Zehnder modulator (MZM) type.

13. The apparatus of claim 11, wherein the electro-optical modulator is an external electro-optical modulator.

14. The apparatus of claim 11, wherein the quadrature modulation scheme uses a quadrature amplitude modulation (QAM) constellation of size four or higher.

15. The apparatus of claim 11, wherein the apparatus generates the vector signal for translation without precoding amplitudes to mitigate distortions.

16. The apparatus of claim 11, further including an external cavity laser to input an optical carrier signal to the single electro-optical modulator.

17. The apparatus of claim 12, wherein the MZM electro-optical modulator is biased to operate at a minimum transmission point.

18. The apparatus of claim 12, wherein the MZM electro-optical modulator includes an MZM intensity modulator.

19. The apparatus of claim 11, wherein a frequency spectrum of the vector signal comprises a first subcarrier pair spaced at twice the first frequency and a second subcarrier pair spaced at twice the second frequency.

20. The apparatus of claim 11, further including performing polarization domain multiplexing of the combined signal with another modulated information signal.

21. An optical communication system, comprising:
    a transmitter, including:
        an input circuit that receives information bits;
        a modulator circuit that modulates the information bits using a quadrature modulation scheme to generate a modulated intermediate signal at a first frequency;
        a radio frequency (RF) signal combiner that produces a combined signal by adding an unmodulated carrier having a second frequency to the modulated intermediate signal;
        no more than one electro-optical modulator that coverts the combined signal into a vector signal for transmission over an optical communication medium;
    a receiver, including:
        a variable gain attenuator to generate a power adjusted vector signal in response to a received vector signal;
        a photodiode to generate an electrical domain signal in response to detection of the power adjusted vector signal; and
        a demodulator to demodulate the electrical domain signal to recover the information bits.

22. The optical communication system of claim 21, wherein the transmitter further comprises:

an erbium-doped fiber amplifier (EDFA) to amplify the vector signal prior to transmission over the optical communication medium.

* * * * *